(12) United States Patent
Hemmerich et al.

(10) Patent No.: US 6,273,604 B1
(45) Date of Patent: Aug. 14, 2001

(54) ANALYTICAL INSTRUMENT FOR MEASURING HEAT EVOLUTION

(75) Inventors: Johann Ludwig Hemmerich, Oxford; Andrew George Miller, Witney Oxon, both of (GB)

(73) Assignee: European Atomic Energy Community (EURATOM), Plateau du Kirchberg (LU)

(*) Notice: Subject to any disclaimer, the term of this patent is extended or adjusted under 35 U.S.C. 154(b) by 0 days.

(21) Appl. No.: 09/446,129
(22) PCT Filed: Jul. 2, 1998
(86) PCT No.: PCT/GB98/01952
    § 371 Date: Feb. 29, 2000
    § 102(e) Date: Feb. 29, 2000
(87) PCT Pub. No.: WO99/01729
    PCT Pub. Date: Jan. 14, 1999

(30) Foreign Application Priority Data

Jul. 4, 1997 (GB) .................................... 9714232

(51) Int. Cl.[7] ............................ G01N 25/00; G01K 17/06
(52) U.S. Cl. .................................. 374/45; 374/29; 374/43
(58) Field of Search .................................. 374/29, 30, 31, 374/32, 33, 45, 43

(56) References Cited

U.S. PATENT DOCUMENTS

| | | | |
|---|---|---|---|
| 4,968,151 | * | 11/1990 | Thomson ........................... 374/135 |
| 5,152,607 | * | 10/1992 | Ibar ...................................... 374/45 |
| 5,294,199 | * | 3/1994 | Boersen et al. ..................... 374/57 |
| 5,302,023 | * | 4/1994 | Larsen et al. ....................... 374/46 |
| 5,356,216 | * | 10/1994 | Jeng ..................................... 374/31 |
| 5,356,217 | * | 10/1994 | Sheffield ............................. 374/45 |
| 5,988,875 | * | 11/1999 | Gershfeld et al. ................. 374/10 |
| 6,116,777 | * | 9/2000 | Pause .................................. 374/43 |
| 6,132,082 | * | 10/2000 | Pause .................................. 374/43 |
| 6,193,413 | * | 2/2001 | Lieberman ......................... 374/45 |

FOREIGN PATENT DOCUMENTS 2 717 900    9/1995  (FR) .

OTHER PUBLICATIONS

Hemmerich J.L. et al., "High–Resolution Tritium Calorimetry Based on Inertial Temperature Control", Review of Scientific Instruments, 65:5, May 1994, XP000454946.

* cited by examiner

Primary Examiner—Diego Gutierrez
Assistant Examiner—Gail Verbitsky
(74) Attorney, Agent, or Firm—Bacon & Thomas

(57) ABSTRACT

The present invention relates to a device for measuring heat evolution in a homogenous fluid sample. The device comprises: (i) a first chamber having a heat capacity $C_1$ and an internal surface of area $A_1$ defining a cavity for containing a volume $V_1$ of the said fluid; (ii) a second chamber having a heat capacity $C_2$ and an internal surface of area $A_2$ defining a cavity for containing a volume $V_2$ of the said fluid, wherein $C_1$ is approximately equal to $C_2$, $A_1$ is approximately equal to $A_2$ and $V_1$ is greater than $V_2$; (iii) means to detect and measure heat flow between the first and second chambers; and (iv) means to achieve a temperature equilibration between the two chambers.

15 Claims, 3 Drawing Sheets

ANALYTICAL INSTRUMENT FOR MEASURING HEAT EVOLUTION

The present invention relates to an analytical instrument for measuring heat evolution in homogeneous fluid samples and, in particular, to a calorimeter for measuring radioactive decay heats in tritium containing gases for the purpose of determining the concentration of tritium therein.

For the avoidance of doubt, the term fluid is intended to include any substance in gas or liquid form, which can be transported through tubes or pipes to fill volumes of suitable shape and size without voids. By the term homogeneous is meant that heat evolution takes place substantially homogeneously throughout a sample volume, i.e. substantially identical amounts of heat per unit volume and time are generated at any location within the fluid sample. Such fluids include:

(a) Gases containing a heat evolving constituent in pure form, as an admixture or chemically bound to other chemical elements, including mixtures thereof. For example, gases containing a radioactive element, such as tritium in pure form as molecular $T_2$, in mixtures with the other hydrogen isotopes ($H_2$ and $D_2$), in heterogeneous chemical compounds (HT, DT) or chemically bound in more complicated molecules such as, for example, tritiated (singly or multiply) methane or ethane. Since heat evolved during the radioactive decay of tritium to $^3He$ is independent of its chemical bonds to other atoms or molecules, the precise measurement of heat evolved from a sample enables the quantity of tritium in the gas (or mixture) per unit volume to be determined.

(b) Liquids containing a heat evolving constituent in pure form, as an admixture or chemically bound to other constituents of the liquid, including mixtures thereof. For example, liquids containing a radioactive element in pure form or in solution. By measuring the heat evolution from such a sample, the concentration of the radioactive element in solution can be determined. Data thus obtained may be used to monitor and control, for example, fuel composition in homogeneous fission reactors (consisting of fissionable materials in the form of aqueous salt solutions) or the concentration of radioactive elements in liquid solutions in fission fuel reprocessing plants, both in product and waste streams.

(c) Liquid suspensions or emulsions containing a heat evolving constituent, homogeneously distributed or otherwise generating heat homogeneously throughout their volume, as a result of, for example, chemical or biochemical reactions. For liquid solutions, suspensions and emulsions which evolve heat due to chemical or biochemical reactions, measurement of the heat evolved may be used for control of (bio-) chemical processes.

In order to measure radioactive gas concentrations, such as tritium concentrations, in gas samples at atmospheric pressure and room temperature with sufficient resolution and accuracy, a magnetic sector mass spectrometer may be used. Such instruments are, however, very large and complex.

The present invention provides an analytical instrument which, in one embodiment, is capable of detecting tritium in gas samples with a resolution and accuracy which matches or exceeds that of magnetic sector mass spectrometers. The analytical instrument is also capable of analysing, for example, tritium concentration in gas samples without the production of radioactive waste; the sample is unadulterated and can be returned to the process after measurement. In contrast, conventional techniques and devices produce radioactive waste streams which have to be reprocessed with some residual contamination ending up as waste.

Accordingly, the present invention provides a device for measuring heat evolution in a homogeneous fluid sample, the device comprising:

(i) a first chamber having a heat capacity $C_1$ and an internal surface of area $A_1$ defining a cavity for containing a volume $V_1$ of the said fluid;

(ii) a second chamber having a heat capacity $C_2$ and an internal surface of area $A_2$ defining a cavity for containing a volume $V_2$ of the said fluid, wherein $C_1$ is approximately equal to $C_2$, $A_1$ is approximately equal to $A_2$ and $V_1$ is greater than $V_2$;

(iii) means to detect and measure heat flow between the first and second chambers; and (iv) means to achieve a temperature equilibration between the two chambers.

The device according to the present invention constitutes a differential micro-calorimeter. The conservation of full symmetry (with the exception of volume difference) as specified in (ii) above is necessary in order to eliminate errors caused by sample lines, surface adsorption and fluctuations in the temperature, which would otherwise cause differences in heat flow to or from either or both volumes other than the desired volume difference effect.

For the avoidance of doubt, a temperature equilibration exists when there is zero or almost zero net heat flow between the two chambers. The means to achieve temperature equilibration preferably comprises heating means to heat the second chamber, which is advantageously responsive to the measured heat flow. This may be achieved by, for example, a feedback control loop.

The means to measure and detect heat flow may be achieved by connecting the first and second chambers by a heat flow sensor. Although a single differential thermocouple may be used, commercially available thermopiles are preferred. Such thermopiles are typically formed from materials having a high thermal EMF, such as p- and n-conducting bismuth telluride semiconductors, which are normally used as thermoelectric heat pumps (Peltier effect). In the range of from 500 to 1500 electrically series-connected thermocouples may typically connect the first and second chambers. Once a heat evolving sample is admitted into the device, it will be appreciated that the larger volume $V_1$ will receive more heat than the reference volume $V_2$. This results in a heat flow through the thermopiles from $V_1$ to $V_2$, which causes an electrical signal to be generated by the heat flow sensor. The surplus heat generated in $V_1$ may be measured as follows. $V_2$ is heated by, for example, an electrical heater, such that the heat flow detected by the heat flow sensor is approximately zero, thus forcing temperature equilibration between the two volumes. The power applied to the heater attached to $V_2$ is then equal to the surplus power in the effective measuring volume $V_1-V_2$. This power can be electrically measured by measuring the current through and the voltage drop across the heating resistor attached to $V_2$.

In order to make temperature equilibration automatic, an accurate and sensitive industrial controller with PID (Proportional, Integral, Differential) features is advantageously used. In one embodiment of the invention suitable for tritium gas concentration measurements, the thermopile signal is connected to its ±10 mV input, the set-point is set to zero and its 0–20 mA output is connected to a 5Ω heating resistor attached to $V_2$. Heating current and voltage are measured by means of a sensitive Digital Multimeter. The heat evolved by tritium gas of approximately 100% purity in a volume of about 20 cm$^3$ at a pressure of 100 kPa and a temperature of 300 K is 1.567 mW. The equipment used permits a resolution of approximately 1W and hence tritium concentration in the sample can be measured with a resolution of better than 0.1%. This is equivalent to a tritium concentration of 0.16 $\mu$gcm$^{-3}$.

Advantageously, the device according to the present invention includes a test feature in the form of an additional heating means to heat the first chamber. This permits the simulation of the admission of a sample by applying a fixed amount of heater power. For example, applying a heating power of 1.567 mW to $V_1$ would simulate admission of tritium of 100% purity under the conditions given above. Once the control system is correctly tuned and operating, its response will be to apply an approximately equal heater power to the heater attached to $V_2$. This feature permits the operation of the instrument to be optimised without the encumbrance of handling radioactive substances during commissioning. It also permits to check correct functioning of the system prior to admission or after removal of a sample.

The heating means for the second chamber and/or the first chamber may comprise one or more electrical resistance heaters.

The device according to the present invention preferably further comprises means to ensure that the first and second chambers are at a know and controllable temperature by connecting each chamber to a temperature controlled base through legs or support pillars of identical and defined heat flow conductance.

It will be appreciated that the various constituent parts of the device according to the present invention should be formed from materials which are physically and chemically compatible with the fluid sample. In the case of tritium gas mixtures, materials having a low diffusivity for hydrogen and negligible chemical reactivity therewith are advantageously chosen. From this point of view, and considering further that a high thermal conductivity ($\geq 100$ Wm$^{-1}$K$^{-1}$) is desirable for fast thermal response, suitable construction materials include molybdenum, aluminium, gold and tungsten, including alloys thereof. A Molybdenum TZM alloy (Mo 99.5% Zr 0.5%) is advantageously used, since this material can be machined to precise dimensions and can also be reliably joined or bonded by, for example, vacuum furnace brazing to achieve leak-tight joints. Alternatively, an electrically conductive ceramic may be used, such as silicon carbide, more preferably reaction-bonded silicon carbide. This material offers the following advantages: a low thermal expansion coefficient (about 4.6×10$^{-6}$ K$^{-1}$); a high thermal conductivity (about 200 Wm$^{-1}$K$^{-1}$); an electrical conductivity of about 10$^{-2}$ $\Omega^{-1}$ cm$^1$, which prevents radiation damage by space charge build-up. Furthermore, this material is also capable of being polished to optical quality, which permits high precision in mechanical dimensions and minimises the surface area for adsorption. An additional benefit is that tritium permeation in silicon carbide is negligible. The mass of the first chamber is preferably approximately equal to the mass of the second chamber.

Both the first and second chambers typically have a length of 70 mm and are preferably closed by end-plates using a technique such as gold diffusion bonding. The internal cavity in each chamber is preferably connected to gas feed/purge lines by gold bonded Kovar end caps of matched thermal expansion coefficient. The connecting lines are preferably vacuum furnace brazed to the Kovar end caps and advantageously internally gold plated prior to assembly in order to minimise adsorption of tritium.

In order to achieve the recited relationship between $V_1$ and $V_2$ and $A_1$ and $A_2$, the cavity of the first chamber may be, for example, generally cylindrical and the cavity of the second chamber generally annular.

The first and second chambers, the means to measure heat flow and the means to achieve a thermal equilibrium are preferably located in a secondary containment. Such containment is advantageously permanently evacuated by, for example, a getter pump using ST707 pellets.

The fluid sample may be admitted in to the first and second chamber by any suitable means. For example, the fluid may be supplied through tubing to $V_1$ and purged through $V_1$ and $V_2$ to a return line. Tubing size and connection geometry are preferably substantially identical at all connections in order to account for heat evolved in the tubing, which during the measurement is also filled with fluid sample.

The device according to the present invention preferably further comprises means to measure the fluid sample pressure.

In another aspect the present invention provides a method for measuring the concentration of a heat evolving constituent in a homogeneous fluid sample using a device as herein described, the method comprising the steps of:

(a) introducing the said fluid into the cavities of the first and second chambers;

(b) measuring heat flow from the first chamber to the second chamber;

(c) heating the second chamber in response to the measured heat flow to achieve a temperature equilibration between the first and second chambers;

(d) comparing the heat supplied in step (c) with a reference heat to calculate the concentration of the heat evolving constituent, the reference heat being the heat supplied in step (c) for a fluid containing a known concentration of the heat evolving constituent.

The reference heat is preferably the heat supplied for a material consisting of approximately 100% of the thermally active constituent.

In yet another aspect the present invention provides for the use of a device as herein described to measure heat evolution in a homogeneous fluid sample and/or the concentration of a heat evolving constituent in a homogeneous fluid sample.

The present invention will now be further described with reference to the following drawing, in which.

Figure 1:
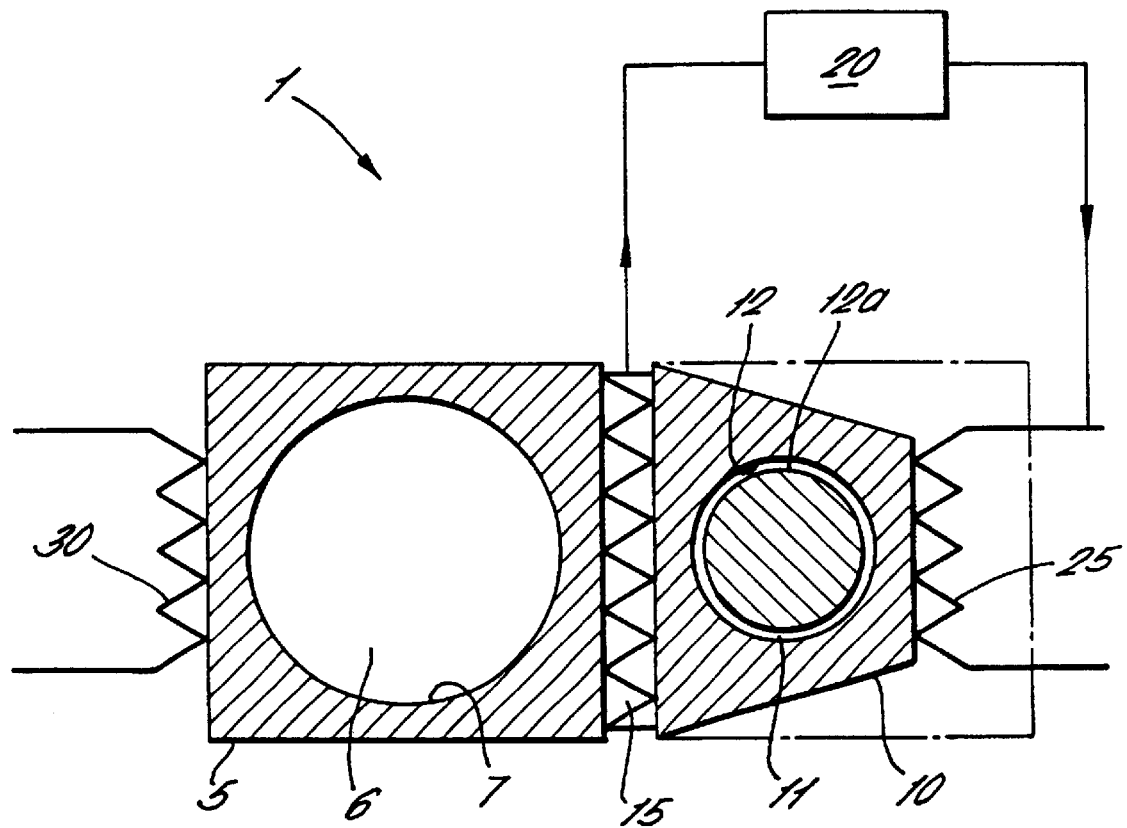
FIG. 1 is a cross-sectional schematic illustration of a device according to one embodiment of the present invention.

The device 1 comprises a first chamber 5 having an internal surface 7 defining a cylindrical cavity 6. In this particular embodiment of the device according to the present invention, the volume of cavity 6 is approximately 22 cm$^3$, but it will be appreciated that smaller or larger volumes may be used.

A second chamber 10 is thermally connected to the first chamber 5 by a heat flow sensor 15, comprising a plurality of series-connected thermocouples (thermopile). The second chamber 10 has internal surfaces 12 and 12a, defining a cavity 11 of annular shape. The volume of cavity 11 is less than the volume of cavity 6. In this embodiment of the present invention, cavity 6 has a volume of approximately 2 cm$^3$, but again smaller or larger volumes may be used.

The dimensions of the internal cavities 6 and 11 are calculated to result in equal surface areas (about 50 cm$^2$. including the circular ends in cavity 6 and the ring-shaped ends in cavity 11) in order to cancel effects caused by surface adsorption of tritium.

The first 5 and second 10 chamber are formed from Molybdenum TZM alloy and have approximately the same mass, as confirmed by accurate weighing to within ±0.1 g after assembly. Their heat capacities are accordingly approximately equal to avoid errors caused by base temperature fluctuations.

The electrical signal from the thermopile output is connected to an electronic controller 20.

A heater 25 is provided for heating the second chamber 10. The heater 25 is connected to the output of the controller 20. The heat supplied to the second chamber 10 in this manner is accordingly in direct response to the signal from the thermopile heat flow sensor 15, which enables attainment of zero or almost zero net heat flow between the first 5 and second chambers 10. A calibrating heater 30 is provided for heating the first chamber 5.

Figure 2:
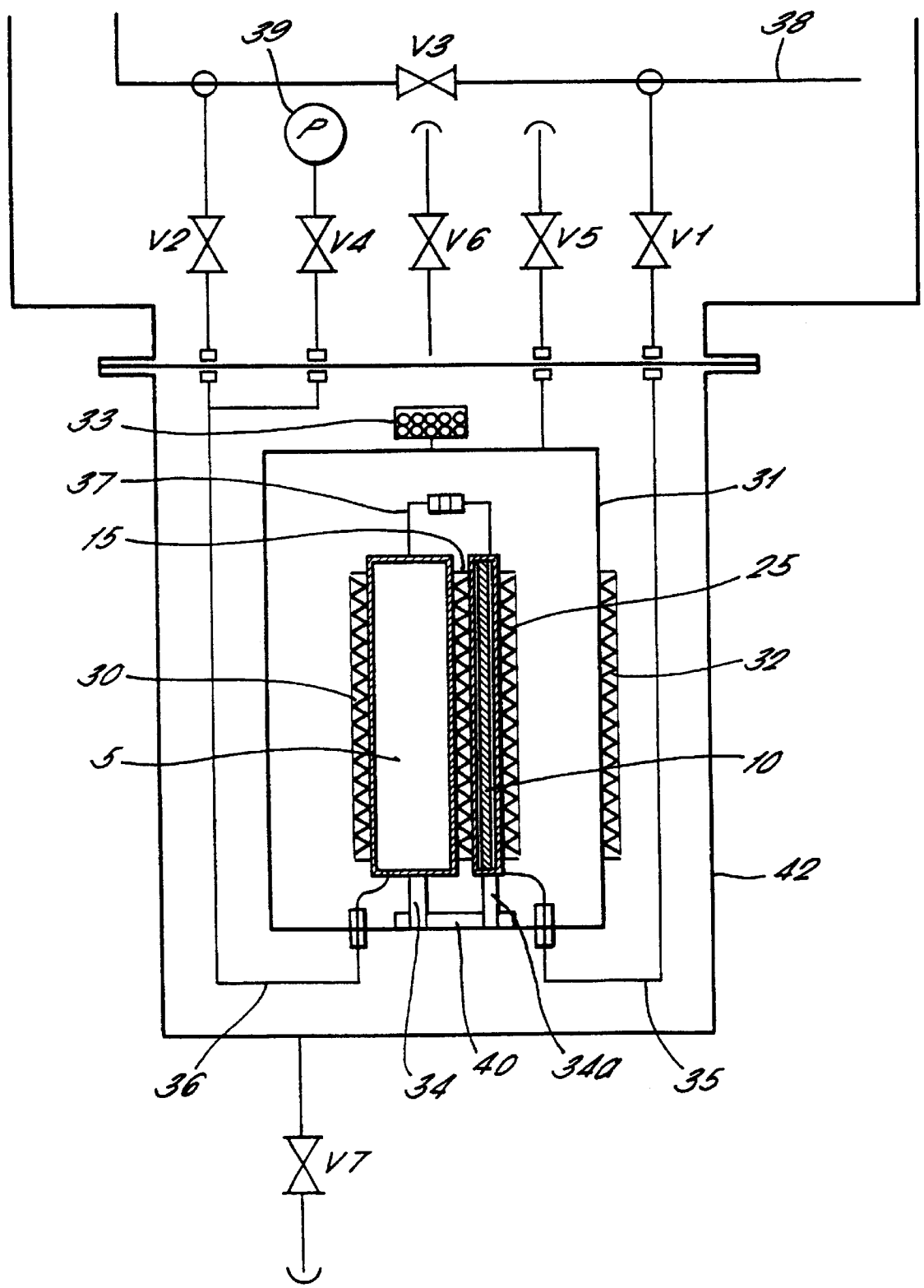
FIG. 2 is a longitudinal sectional view of the device illustrated in FIG. 1.

In FIG. 2 it can be seen that the two chambers 5 and 10 are mounted inside an evacuated vessel 31 on support pillars 34 and 34a respectively which extend from a base 40. The vessel 31 is evacuated by means of a chemical getter pump 33 to a pressure of less than approximately $1 \times 10^{-4}$ mbar. This is preferable for two reasons. First, in order to remove and immobilise tritium in case of a leakage. Second, to provide optimal thermal insulation with respect to the environment. Otherwise it would not be possible to measure heat revolution in the chambers 5 and 10 with the desired resolution.

Sampling lines 35 and 36 and line 37 interconnect chambers 5 and 10 through which samples may be introduced from an external process line 38. A precision capacitance manometer 39 allows system pressure to be measured. The chambers 5 and 10 are mounted in the evacuated vessel 31, which also serves an as isothermal enclosure, whose temperature is controlled in this embodiment to approximately 300±0.05 K by means of a heater 32 using a conventional temperature controller and temperature sensor (not shown). Tertiary containment is shown at 42.

Figure 3:
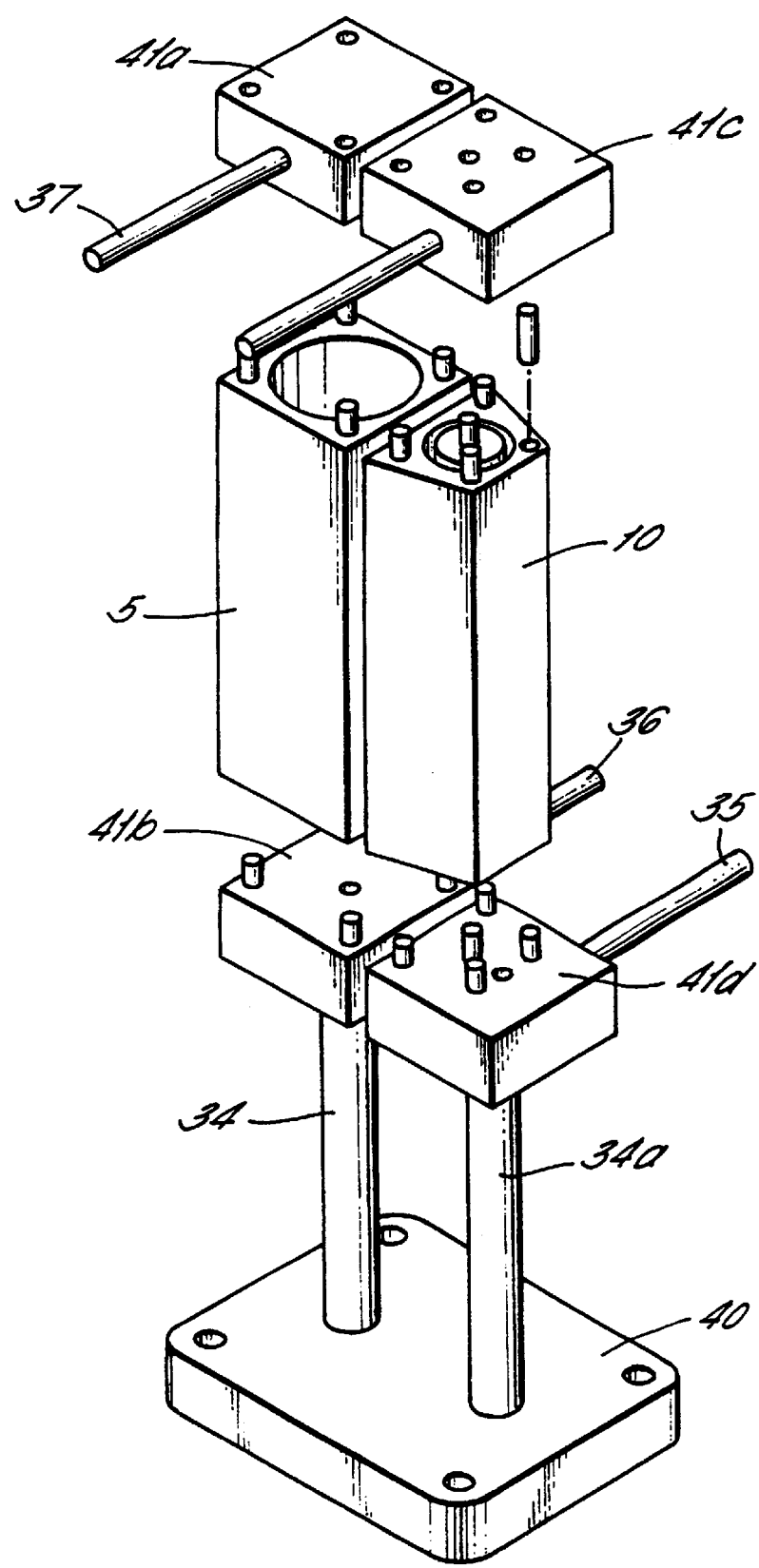
FIG. 3 is an exploded view of the first and second chambers of the device illustrated in FIG. 1.

In FIG. 3 an exploded view of chambers 5 and 10 is shown. End plates for the two chambers 5 and 10 are shown at 41a–d. The support pillars 34 and 34a are preferably made from an alloy (Monel 400) of low thermal conductivity (approximately 21.7 $Wm^{-1}K^{-1}$), and are dimensioned such that the equilibrium temperature rise in the case of admission of pure $T_2$ gas (leading to a heat flow of 1.724 mW in each pillar once the temperature equilibration between chambers 5 and 10 has been achieved) will not exceed the base temperature (controlled by heater 32 to 300±0.05K) by more than 0.1K. This is preferable when gas samples are to be measured, since only an exact knowledge of temperature, pressure and volume through their thermodynamic relationship permits an accurate calculation of the gas sample quantity contained in the volumes which then, in combination with the measured heat output, allows the tritium concentration to be determined.

The actual system temperature is preferably measured on the evacuated isothermal shroud 31 (FIG. 2). Direct measurement on the chambers 5 and 10 is also possible, but is not advisable for fluid samples with low heat outputs, such as tritium containing gases. This is because the heat output of sufficiently accurate temperature sensors (100 ohm platinum resistors) may exceed the sample heat evolution, which could introduce additional asymmetries due to sensor-resistance tolerances and lead to measurement errors. For fluid samples with higher heat outputs, however, it would be possible to attach temperature sensors to the chambers 5 and 10 directly.

The use of device 1 will now be described by way of example with reference to a tritium containing sample gas.

The device 1 is firs t purged with the sample gas through lines 35, 36, 37 and 38 (FIG. 2). By means of this purge, sample gas is introduced into the cavities 6 and 11. Because there is a greater quantity of tritium in the first chamber 5, a temperature gradient will develop between the two chambers 5 and 10. The corresponding heat flow from the first chamber 5 to the second chamber 10 is monitored by the electronic controller 20 in conjunction with the output from the thermopile heat flow sensor 15. The controller 20 operates the heater 25 to heat the second chamber 10 in response to the measured heat flow. By controlling the heater 25 such that the heat flow sensed by the thermopile 15 returns to zero, the controller forces thermal equilibrium (=zero temperature difference) between the first 5 and second 10 chambers. It will be appreciated that the power supplied to the heater 25 in this manner is equal to the difference in decay heat evolved in both cavities 6 and 11. consequently, the measurement of power supplied to the heater 25 is equal to the decay heat generated in the volume of cavity 6 minus the volume of cavity 11, i.e. approximately 20 $cm^3$. With the dimensions selected, pure tritium gas at 100 kPa pressure and a temperature of 300K requires a heat power input of 1.567 mW and the tritium concentration of any gas sample can accordingly be calculated.

The present invention in one of its embodiments provides an analytical instrument which is capable of detecting tritium gas samples with a resolution of approximately 0.16 $\mu$g/cm. The instrument may be used to measure the tritium concentration in gaseous product streams, such as the products from isotope separation systems, for example gas chromatography and cryogenic distillation.

The device according to the present invention is capable of measuring tritium concentration in gas samples at atmospheric pressures (100 kPa) and room temperature (300K) with a resolution and accuracy of better than 0.1%. Such an accuracy could otherwise only be achieved by the use of large and complex magnetic sector mass spectrometers.

Furthermore, the device according to the invention is capable of analysing tritium concentration in gas samples without the production of radioactive waste, the sample is unadulterated and can be returned to the process after measurement. In contrast, conventional techniques and devices produce radioactive waste streams which have to be reprocessed with some residual contamination ending up as waste.

An additional advantage is that the device does not require standard gas mixtures for calibration. Calibration can be performed at any time (even with a gas sample in the test loop) merely by applying a precisely measured electrical power to the heater of the first chamber and confirmation by measuring an identical reaction in the heating means of the second chamber after equilibration of the feedback control loop.

What is claimed is:

1. A device for measuring heat evolution in a homogeneous fluid sample, the device comprising:
   (i) a first chamber having a heat capacity $C_1$ and an internal surface of area $A_1$ defining a cavity for containing a volume $V_1$ of the said fluid;
   (ii) a second chamber having a heat capacity $C_2$ and an internal surface of area $A_2$ defining a cavity for containing a volume $V_2$ of the said fluid, wherein $C_1$ is approximately equal to $C_2$, $A_1$ is approximately equal to $A_2$ and $V_1$ is greater than $V_2$;
   (iii) means to detect and measure heat flow between the first and second chambers; and
   (iv) means to achieve a temperature equilibration between the two chambers.

2. A device as claimed in claim 1, wherein the means to achieve a temperature equilibration comprises heating means to heat the second chamber.

3. A device as claimed in claim 1, wherein the means to achieve temperature equilibration is responsive to the measured heat flow.

4. A device as claimed in claim 1, wherein the means to measure and detect the heat flow comprises one or more thermopiles.

5. A device as claimed in claim 1, further comprising heating means to heat the first chamber.

6. A device as claimed in claim 2, wherein the heating means comprises one or more ohmic heaters.

7. A device as claimed in claim 1, wherein means are provided to measure the sample pressure.

8. A device as claimed in claim 1, wherein the mass of t first chamber is approximately equal to the mass of the second chamber.

9. A device as claimed in claim 1, wherein one or both of the said chambers is/are formed from a material comprising molybdenum, aluminium, gold or tungsten, including alloys thereof, or an electrically conducting ceramic.

10. A device as claimed in claim 9, wherein one or both of the said chambers is/are formed from a molybdenum TZM alloy or silicon carbide.

11. A device as claimed in claim 1, wherein the cavity of the first chamber is generally cylindrical and the cavity of the second chamber is generally annular.

12. A method for measuring the concentration of a heat evolving constituent in a homogeneous fluid sample using a device as claimed in claim 2, the method comprising the steps of:

(a) introducing the said fluid into the cavities of the first and second chambers;

(b) measuring heat flow from the first chamber to the second chamber;

(c) heating the second chamber in response to the measured heat flow to achieve a temperature equilibration between the first and second chambers;

(d) comparing the heat supplied in step (c) with a reference heat to calculate the concentration of the heat evolving constituent, the reference heat being the heat supplied in step (c) for a fluid containing a known concentration of the heat evolving constituent.

13. A method as claimed in claim 12, wherein the reference heat is the heat supplied for a fluid consisting of approximately 100% of the heat evolving constituent.

14. A method as claimed in claim 12, wherein the heat evolving constituent is radioactive.

15. A method as claimed in claim 12, wherein the heat evolving constituent comprises tritium.

\* \* \* \* \*